(12) United States Patent
Naegle

(10) Patent No.: US 10,412,058 B2
(45) Date of Patent: Sep. 10, 2019

(54) SYSTEMS AND METHODS FOR USING MECHANICAL VIBRATION FOR OUT-OF-BAND COMMUNICATIONS ONBOARD A VEHICLE

(71) Applicant: GM GLOBAL TECHNOLOGY OPERATIONS LLC, Detroit, MI (US)

(72) Inventor: Andrew Naegle, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 15/490,020

(22) Filed: Apr. 18, 2017

(65) Prior Publication Data
US 2018/0302381 A1    Oct. 18, 2018

(51) Int. Cl.
*H04L 29/06* (2006.01)
*H04L 9/08* (2006.01)
*H04L 9/32* (2006.01)
*H04W 4/48* (2018.01)

(52) U.S. Cl.
CPC ........ *H04L 63/0428* (2013.01); *H04L 9/0894* (2013.01); *H04L 9/3236* (2013.01); *H04L 9/3239* (2013.01); *H04L 63/061* (2013.01); *H04L 63/18* (2013.01); *H04L 2209/805* (2013.01); *H04L 2209/84* (2013.01); *H04W 4/48* (2018.02)

(58) Field of Classification Search
CPC ........ H04W 4/046; H04W 4/48; H04L 67/12; H04L 63/0428; H04L 9/0894
See application file for complete search history.

(56) References Cited

U.S. PATENT DOCUMENTS

| | | | | |
|---|---|---|---|---|
| 2013/0304276 | A1* | 11/2013 | Flies | G06F 17/00 701/1 |
| 2016/0173505 | A1* | 6/2016 | Ichihara | H04L 63/123 713/170 |
| 2017/0134382 | A1* | 5/2017 | Darnell | H04L 63/10 |
| 2018/0234843 | A1* | 8/2018 | Smyth | H04W 76/10 |

OTHER PUBLICATIONS

Farshteindiker, B. et al., "How to Phone Home with Someone Else's Phone: Information Exfiltration Using Intentional Sound Noise on Gyroscopic Sensors," USENIX Security Symposium, WOOT 2016 10th USENIX Workshop on Offensive Technologies, Aug. 2016, pp. 1-10.

* cited by examiner

*Primary Examiner* — Dao Q Ho
(74) *Attorney, Agent, or Firm* — Lorenz & Kopf, LLP

(57) ABSTRACT

A method for providing out-of-band data onboard a vehicle is provided. The method receives binary motion data, by a motion sensor onboard the vehicle; interprets the binary motion data to identify an encryption key, by a processor communicatively coupled to the motion sensor; stores the encryption key in a memory element communicatively coupled to the processor; encrypts a message using the encryption key, by the processor, to generate an encrypted message; and transmits the encrypted message, via a communication device communicatively coupled to the processor.

13 Claims, 7 Drawing Sheets

SYSTEMS AND METHODS FOR USING MECHANICAL VIBRATION FOR OUT-OF-BAND COMMUNICATIONS ONBOARD A VEHICLE

TECHNICAL FIELD

Embodiments of the subject matter described herein relate generally to transmitting encryption data onboard a vehicle. More particularly, embodiments of the subject matter relate to transmitting encryption data using out-of-band mechanical vibrations.

BACKGROUND

A motor vehicle may include sensors, devices, and systems that wirelessly transmit vehicle status data to a vehicle onboard computer system. Onboard a vehicle, securing such wireless communications protects transmitted messages from interference and/or unauthorized interception. Additionally, secure communications provide confidentiality for sensitive data and integrity of transmitted messages.

Accordingly, it is desirable to provide data security for vehicle-based wireless communications. Furthermore, other desirable features and characteristics will become apparent from the subsequent detailed description and the appended claims, taken in conjunction with the accompanying drawings and the foregoing technical field and background.

BRIEF SUMMARY

Some embodiments of the present disclosure provide a method for providing out-of-band data onboard a vehicle. The method receives binary motion data, by a motion sensor onboard the vehicle; interprets the binary motion data to identify an encryption key, by a processor communicatively coupled to the motion sensor; stores the encryption key in a memory element communicatively coupled to the processor; encrypts a message using the encryption key, by the processor, to generate an encrypted message; and transmits the encrypted message, via a communication device communicatively coupled to the processor.

Some embodiments of the present disclosure provide a system for providing out-of-band data onboard a vehicle. The system includes: a memory element; a motion sensor, configured to receive binary motion data comprising a sequence of vibrations and periods of stillness; a communication device, configured to establish a communication connection to a vehicle-based computer system and to transmit data via the communication connection; and at least one processor communicatively coupled to the memory element, the motion sensor, and the communication device, the at least one processor configured to: interpret the binary motion data to identify an encryption key; store the encryption key in the memory element; encrypt a message using the encryption key, to generate an encrypted message; and transmit the encrypted message, via the communication device.

Some embodiments of the present disclosure provide a non-transitory, computer-readable medium containing instructions thereon, which, when executed by a processor, perform a method. The method receives binary motion data, via a physical connection between a motion sensor and a vehicle-based computer system; identifies an encryption key based on the binary motion data, by the processor, the processor communicatively coupled to the motion sensor; encrypts a message, by the processor, using the encryption key, to generate an encrypted message; and transmits the encrypted message, via a communication device communicatively coupled to the processor.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

The subject matter presented herein relates to systems and methods for transmitting secure communications between a vehicle-based computer system and one or more wireless sensors onboard the vehicle. More specifically, the subject matter relates to providing an encryption key, from the vehicle-based computer system to one or more sensors, via an out-of-band, secure communication. The sensors are then capable of transmitting encrypted data to the vehicle-based computer system via a standard wireless communication channel.

Figure 1:
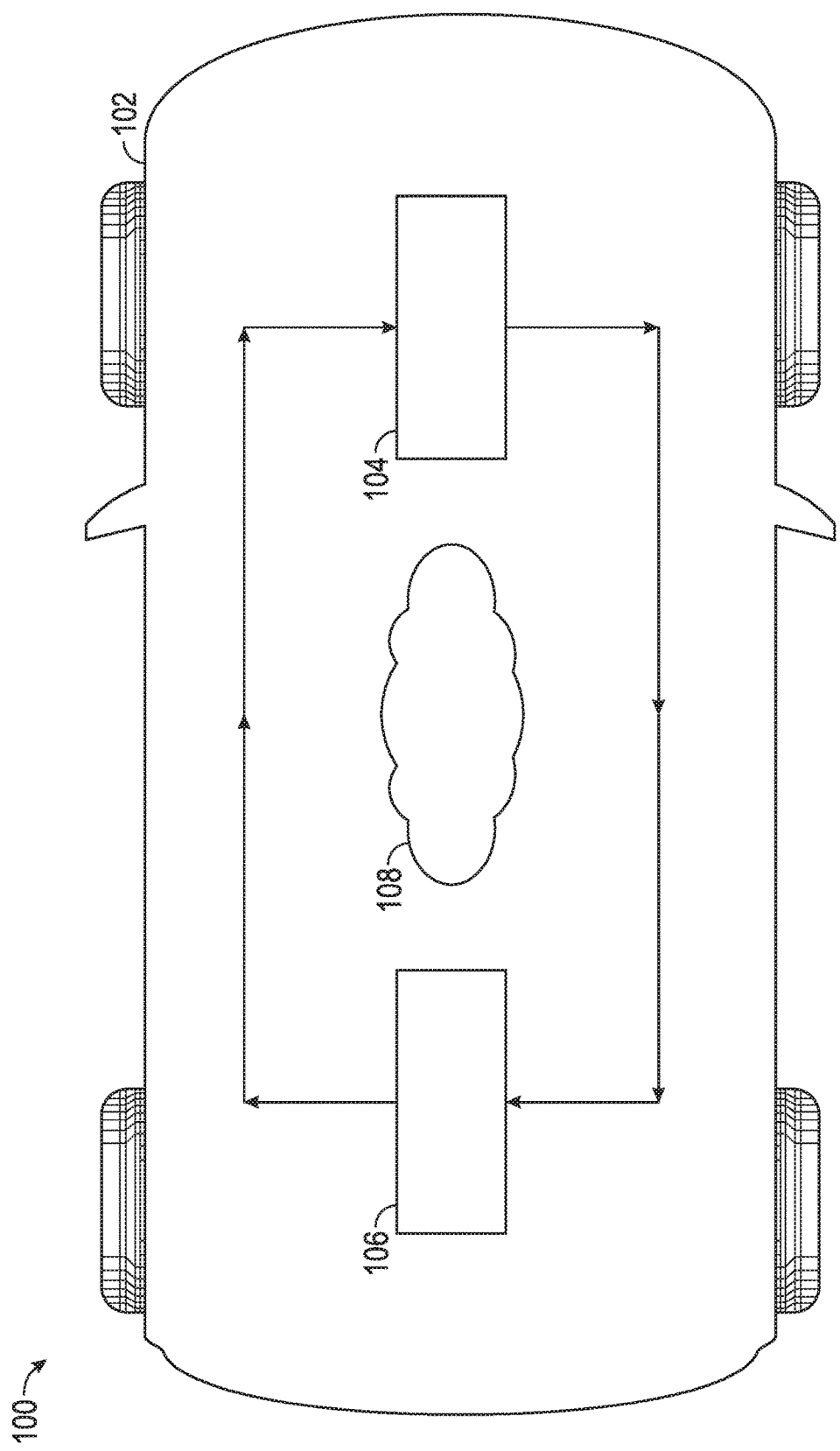
FIG. 1 is a diagram of a vehicle-based encryption system, in accordance with the disclosed embodiments.

Turning now to the figures, FIG. 1 is a diagram of a vehicle-based encryption system 100, in accordance with the disclosed embodiments. The vehicle-based encryption system 100 operates to generate, securely transmit, and use an encryption key for secured wireless communications onboard a vehicle 102. The vehicle-based encryption system 100 may include, without limitation, a vehicle-based computer system 104 that communicates with a sensor 106 onboard the vehicle 102 via a data communication network 108 and/or via a physical connection. In practice, certain embodiments of the vehicle-based encryption system 100 may include additional or alternative elements and components, as desired for the particular application.

The vehicle 102 may be any one of a number of different types of automobiles (sedans, wagons, trucks, motorcycles, sport-utility vehicles, vans, etc.), aviation vehicles (such as airplanes, helicopters, etc.), watercraft (boats, ships, jet skis, etc.), trains, all-terrain vehicles (snowmobiles, four-wheelers, etc.), military vehicles (Humvees, tanks, trucks, etc.), rescue vehicles (fire engines, ladder trucks, police cars, emergency medical services trucks and ambulances, etc.), spacecraft, hovercraft, and the like.

The vehicle-based computer system 104 may be implemented using any number (including only one) of electronic control modules onboard the vehicle 102. The vehicle-based computer system 104 includes various informational and/or entertainment (i.e., "infotainment") system components that are not illustrated in FIG. 1 for sake of clarity, such as one or more ports (e.g., USB ports), one or more wireless communication interfaces (e.g., Bluetooth, Wi-Fi), input/output (I/O) devices, one or more displays, one or more audio systems, one or more radio systems, a navigation system, and the like. In one embodiment, the I/O devices, displays, and audio systems collectively provide a human machine interface (HMI) inside the vehicle.

The sensor 106 may be implemented as any vehicle onboard sensor, device, or system capable of acquiring vehicle data and transmitting the vehicle data to the vehicle-based computer system 104. In exemplary embodiments, the sensor 106 may be implemented as an oil pressure sensor, a wireless actuator for controlling the rear-view mirrors, a wireless sensor/actuator installed in vehicle trailer for controlling lights, brakes, or a wireless sensor/actuator installed in vehicle trailer for detecting trailer theft.

The vehicle-based computer system 104 is configured to communicate with the sensor 106 (1) via an "in-band" wired and/or wireless data connection using the data communication network 108, and (2) via an "out-of-band" physical connection. The data communication network 108 may be any digital or other communications network capable of transmitting messages or data between devices, systems, or components. In certain embodiments, the data communication network 108 includes a packet switched network that facilitates packet-based data communication, addressing, and data routing. The packet switched network could be, for example, a wide area network, the Internet, or the like. In various embodiments, the data communication network 108 includes any number of public or private data connections, links or network connections supporting any number of communications protocols. The data communication network 108 may include the Internet, for example, or any other network based upon TCP/IP or other conventional protocols. In various embodiments, the data communication network 108 could also incorporate a wireless and/or wired telephone network, such as a cellular communications network for communicating with mobile phones, personal digital assistants, and/or the like. The data communication network 108 may also incorporate any sort of wireless or wired local and/or personal area networks, such as one or more IEEE 802.3, IEEE 802.16, and/or IEEE 802.11 networks, and/or networks that implement a short range (e.g., Bluetooth) protocol. For the sake of brevity, conventional techniques related to data transmission, signaling, network control, and other functional aspects of the systems (and the individual operating components of the systems) may not be described in detail herein. Exemplary embodiments of the data communication network 108 include a short-range, in-vehicle wireless network, such as a Bluetooth network or a Bluetooth Low Energy (BLE) network.

Figure 2:
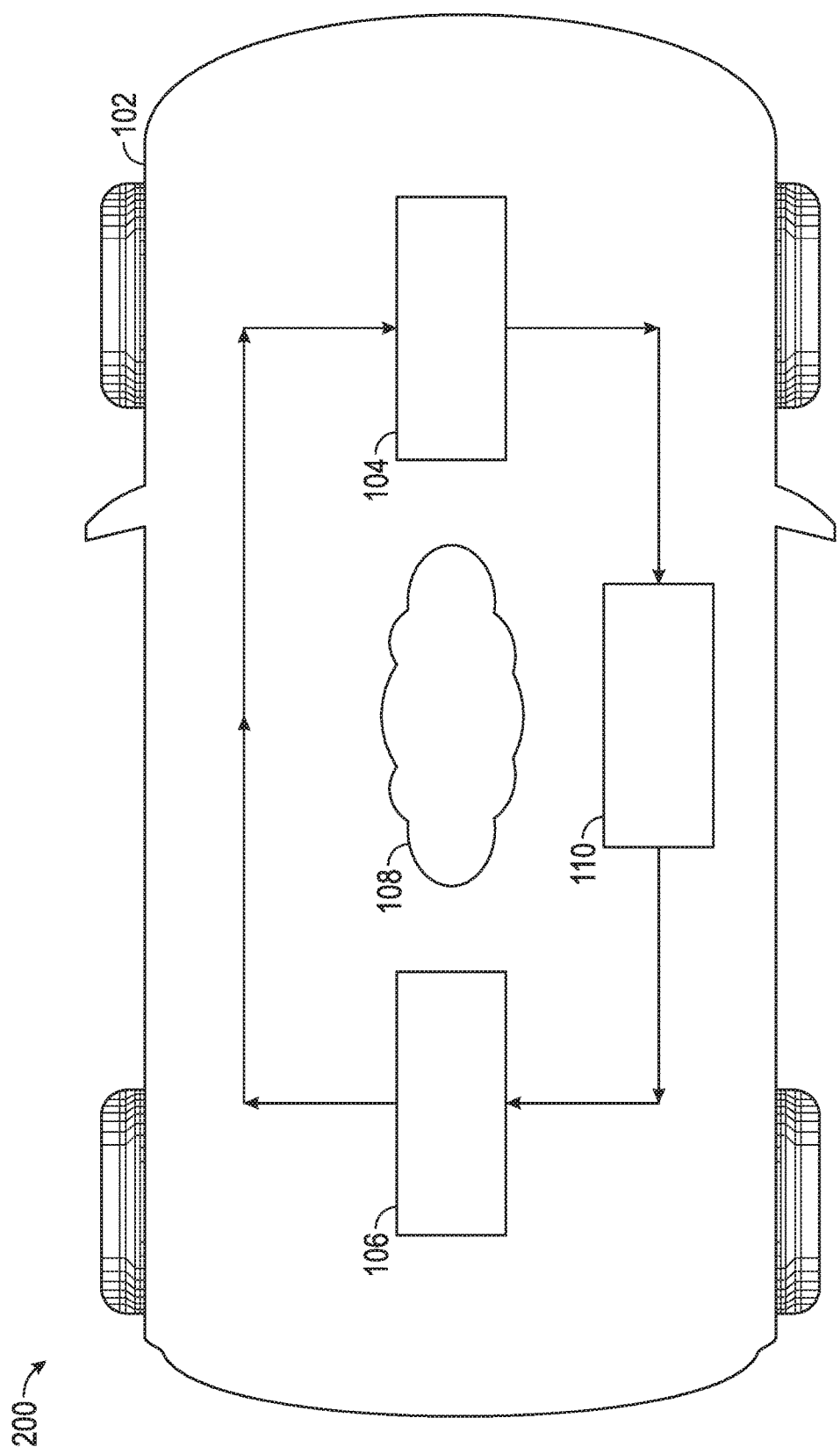
FIG. 2 is a diagram of another embodiment of a vehicle-based encryption system, in accordance with the disclosed embodiments.

The out-of-band physical connection is created when the sensor 106 (which includes an internal motion sensor, as shown in FIG. 2) is in direct physical contact with the vehicle-based computer system 104. For example, the sensor 106 may be placed on top of, below, or on one side of the vehicle-based computer system 104 such that the sensor 106 and the vehicle-based computer system 104 are touching. In this scenario, the vehicle-based computer system 104 generates vibrations or other form of mechanical motion, which the sensor 106 receives via an integrated motion sensor (not shown) that is internal to the sensor 106.

During typical operation, the sensor 106 transmits status data associated with the vehicle 102 to the vehicle-based computer system 104 via the data communication network 108. As described herein, prior to transmitting vehicle status data to the vehicle-based computer system 104, the sensor 106 receives an encryption key from the vehicle-based computer system 104 via a secure, out-of-band, physical connection. The vehicle-based computer system 104 is in direct physical contact with the sensor 106 and transmits the encryption key to the sensor 106 using motion data (e.g., vibrations) that are detected by an integrated motion sensor of the sensor 106. The sensor 106 then uses the received encryption key to encrypt future communications (e.g., vehicle status data) to the vehicle-based computer system 104 that are transmitted via the data communication network 108. Thus, the vehicle-based encryption system 100 ensures secure and encrypted communications between the sensor 106 and the vehicle-based computer system 104, during typical operation of the vehicle 102.

In another embodiment of the vehicle-based encryption system 200, as shown in FIG. 2, the sensor 106 receives an encryption key from an intermediary device 110 via a secure, out-of-band, physical connection. The intermediary device 110 may be implemented by any computing device that includes at least one processor, some form of memory hardware, a user interface, communication hardware, and one or more motion sensors. For example, the intermediary device 110 may be implemented using a personal computing device, such as a tablet computer, a personal digital assistant (PDA), a smartphone, a smartwatch, or the like.

In this embodiment, the intermediary device 110 is placed in direct physical contact with the vehicle-based computer system 104, and the vehicle-based computer system 104 transmits the encryption key to the intermediary device 110 using motion data (e.g., vibrations) that are detected by an integrated motion sensor of the intermediary device 110. In this scenario, the sensor 106 may not be positioned in direct physical contact with the vehicle-based computer system 104 and, therefore, the sensor 106 is unable to receive mechanical vibration data directly from the vehicle-based computer system 104. Instead, the intermediary device 110 may be placed in direct physical contact with the vehicle-based computer system 104, where the intermediary device 110 physically touches the vehicle-based computer system 104 and receives motion data (e.g., vibration data) generated by the vehicle-based computer system 104. The intermediary device 110 is then placed in direct physical contact with the sensor 106, and the intermediary device 110 transmits the received motion data to the sensor 106 via motion data, such as mechanical vibration data.

As described in the first embodiment (shown in FIG. 1), the sensor 106 then uses the received encryption key to encrypt future communications (e.g., vehicle status data) to the vehicle-based computer system 104 that are transmitted via the data communication network 108. However, here, the intermediary device 110 acts to remedy the situation in which the sensor 106 is not in direct physical contact with the vehicle-based computer system 104. Thus, the vehicle-based encryption system 100 ensures secure and encrypted communications between the sensor 106 and the vehicle-based computer system 104, in situations where the sensor 106 and the vehicle-based computer system 104 are disparately located onboard the vehicle 102.

Figure 3:
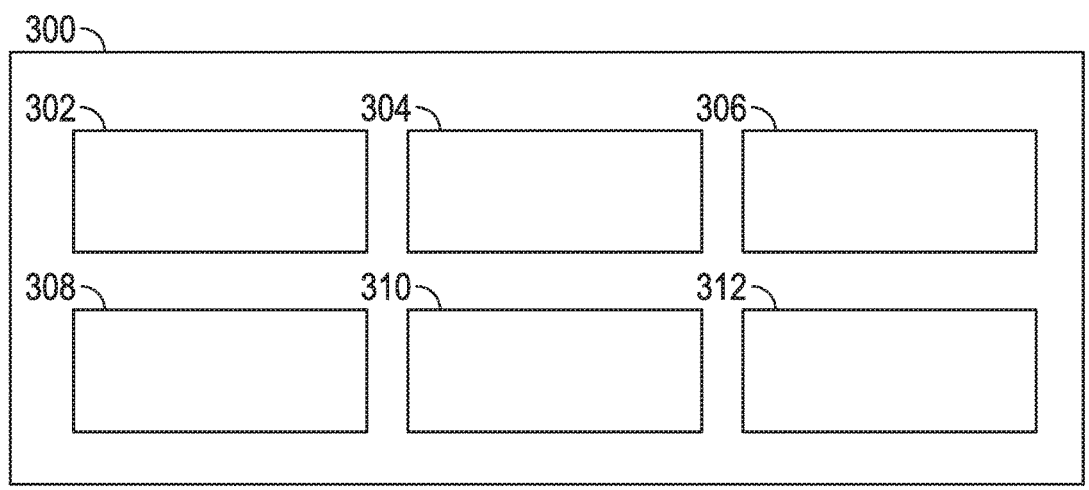
FIG. 3 is a functional block diagram of a sensor for use in a vehicle-based encryption system, in accordance with the disclosed embodiments.

FIG. 3 is a functional block diagram of a sensor 300 for use in a vehicle-based encryption system, in accordance with the disclosed embodiments. It should be noted that the sensor 300 can be implemented with the sensor 106 depicted in FIG. 1. In this regard, the sensor 300 shows certain elements and components of the sensor 106 in more detail. The sensor 300 generally includes, without limitation: at least one processor 302; system memory 304; a wireless communication device 306; at least one motion sensor 308; a binary motion data interpretation module 310; and an encryption module 312. These elements and features of the sensor 300 may be operatively associated with one another, coupled to one another, or otherwise configured to cooperate with one another as needed to support the desired functionality—in particular, receiving in-band (e.g., wireless) communications and out-of-band (e.g., motion data) communications, as described herein. For ease of illustration and clarity, the various physical, electrical, and logical couplings and interconnections for these elements and features are not depicted in FIG. 3. Moreover, it should be appreciated that embodiments of the sensor 300 will include other elements, modules, and features that cooperate to support the desired functionality. For simplicity, FIG. 3 only depicts certain elements that relate to the techniques described in more detail below.

The at least one processor 302 may be implemented or performed with one or more general purpose processors, a content addressable memory, a digital signal processor, an application specific integrated circuit, a field programmable gate array, any suitable programmable logic device, discrete gate or transistor logic, discrete hardware components, or any combination designed to perform the functions described here. In particular, the at least one processor 302 may be realized as one or more microprocessors, controllers, microcontrollers, or state machines. Moreover, the at least one processor 302 may be implemented as a combination of computing devices, e.g., a combination of digital signal processors and microprocessors, a plurality of microprocessors, one or more microprocessors in conjunction with a digital signal processor core, or any other such configuration.

The at least one processor 302 is communicatively coupled to the system memory 304. The system memory 304 is configured to store any obtained or generated data associated with motion data, encryption keys and/or other encryption data, and wireless communications associated with a vehicle-based computer system. The system memory 304 may be realized using any number of devices, components, or modules, as appropriate to the embodiment. Moreover, the sensor 300 could include system memory 304 integrated therein and/or a system memory 304 operatively coupled thereto, as appropriate to the particular embodiment. In practice, the system memory 304 could be realized as RAM memory, flash memory, EPROM memory, EEPROM memory, registers, a hard disk, a removable disk, or any other form of storage medium known in the art. In certain embodiments, the system memory 304 includes a hard disk, which may also be used to support functions of the sensor 300. The system memory 304 can be coupled to the at least one processor 302 such that the at least one processor 302 can read information from, and write information to, the system memory 304. In the alternative, the system memory 304 may be integral to the at least one processor 302. As an example, the at least one processor 302 and the system memory 304 may reside in a suitably designed application-specific integrated circuit (ASIC).

The wireless communication device 306 is suitably configured to communicate data between the sensor 300 and a vehicle-based computer system and/or other computing device onboard the vehicle. The wireless communication device 306 may transmit and receive communications over a wireless local area network (WLAN), the Internet, a satellite uplink/downlink, a cellular network, a broadband network, a wide area network, or the like. Exemplary embodiments of the wireless communication device 306 include a Bluetooth communication device and/or a Bluetooth Low Energy (BLE) communication device, which is configured to establish a communication connection with a vehicle-based computer system by performing a Bluetooth "pairing" onboard the vehicle. As described in more detail below, data received by the wireless communication device 306 may include, without limitation: confirmation of accuracy of an encryption key and other data compatible with the sensor 300. Data provided by the wireless communication device 306 may include, without limitation, encrypted vehicle status data, requests for confirmation of accuracy of a received encryption key, and the like.

The at least one motion sensor 308 is configured to detect motion data acquired from direct physical contact of the sensor 300 with vehicle-based computer system and/or an intermediary device. The at least one motion sensor 308 may be implemented as an accelerometer, a gyroscope, or the like. The sensor 300 is generally positioned such that the sensor 300 is physically touching the vehicle-based computer system or the intermediary device onboard the vehicle, during the establishment of the shared cryptographic key (once the key is established, direct physical contact is no longer required). Through the direct physical contact, the at least one motion sensor 308 functions to receive motion data, such as mechanical vibration data.

The binary motion data interpretation module 310 is configured to interpret the motion data received by the at least one motion sensor 308, and to extract an encryption key from the received motion data. In some embodiments, the motion data includes a sequence of vibrations interspersed with time periods of stillness that are characterized by a lack of vibration. Thus, the motion data is binary in nature, and the motion data may be used to transmit data in a binary fashion. The binary motion data interpretation module 310 recognizes the received binary motion data, and identifies the encryption key included in the binary motion data. Additionally, once the encryption key is received and recognized, the binary motion data interpretation module 310 stores the encryption key into system memory 304 for future encryption use.

The encryption module 312 is configured to use an encryption key that has been identified and stored by the binary motion data interpretation module 310, to encrypt messages for transmission to the vehicle-based computer system via the wireless communication device 306. Thus, the encryption module 312 functions to encrypt and securely transmit vehicle status data, and other relevant data, to the vehicle-based computer system.

In practice, the binary motion data interpretation module 310 and/or the encryption module 312 may be implemented with (or cooperate with) the at least one processor 302 to perform at least some of the functions and operations described in more detail herein. In this regard, the binary motion data interpretation module 310 and/or the encryption module 312 may be realized as suitably written processing logic, application program code, or the like.

Figure 4:
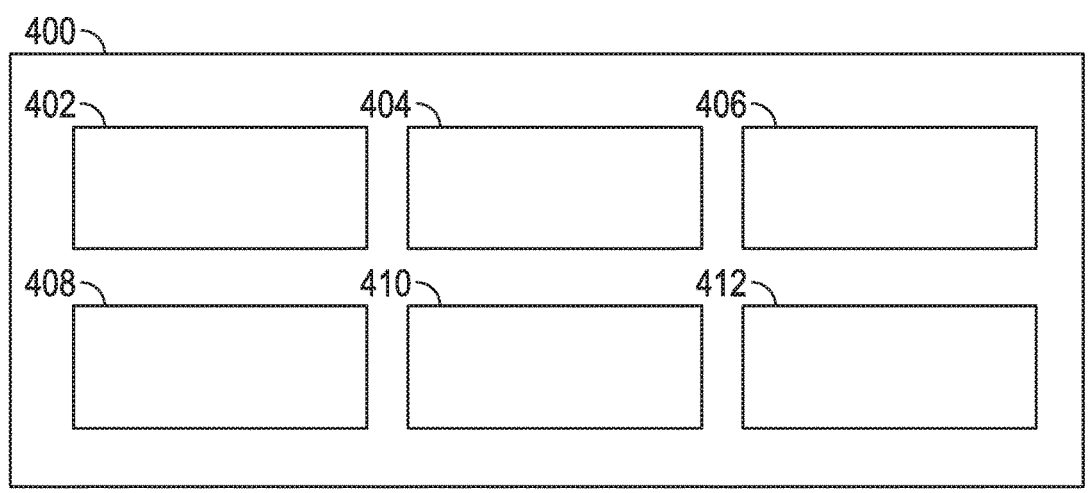
FIG. 4 is a functional block diagram of vehicle-based computer system for use in a vehicle-based encryption system, in accordance with the disclosed embodiments.

FIG. 4 is a functional block diagram of vehicle-based computer system 400 for use in a vehicle-based encryption system, in accordance with the disclosed embodiments. It should be noted that the vehicle-based computer system 400 can be implemented as the vehicle-based computer system 104 depicted in FIG. 1. In this regard, the vehicle-based computer system 400 shows certain elements and components of the vehicle-based computer system 104 in more detail.

The illustrated embodiment of the vehicle-based computer system 400 generally includes, without limitation: at least one processor 402; system memory 404; a wireless communication device 406; an encryption key module 408; a pairing instruction module 410; and a binary motion data output device 412. These elements and features of the vehicle-based computer system 400 may be operatively associated with one another, coupled to one another, or otherwise configured to cooperate with one another as needed to support the functionality of the vehicle-based computer system 400, as described herein. For ease of illustration and clarity, the various physical, electrical, and logical couplings and interconnections for these elements and features are not depicted in FIG. 4. Moreover, it should be appreciated that embodiments of the vehicle-based computer system 400 will include other elements, modules, and features that cooperate to support the desired functionality. For simplicity, FIG. 4 only depicts certain elements that relate to the techniques described in more detail below.

The at least one processor 402, the system memory 404, and the wireless communication device 406 are similar in configuration and function to their counterpart items described above in the context of the sensor 300. Accordingly, common features and operations of these elements of the vehicle-based computer system 400 will not be redundantly described here. However, in some embodiments, the type of information and the format of the data provided by the wireless communication device 406 and/or stored in system memory 404 are different than that associated with the sensor 300. For example, data received by the wireless communication device 406 may include, without limitation: encrypted vehicle status data, requests for confirmation of accuracy of a received encryption key, and other data compatible with the sensor 300. Data provided by the wireless communication device 406 may include, without limitation, confirmation of accuracy of an encryption key, and the like.

The encryption key module 408 is configured to generate an encryption key for transmission to a sensor or other device onboard the vehicle, such that the encryption key may be used to encrypt and securely transmit data communications to the vehicle-based computer system 400. The encryption key module 408 is further configured to store the encryption key in system memory 404 of the vehicle-based computer system 400 for use in interpreting data communications received from the sensor (via the wireless communication device 406). In certain embodiments, the encryption key module 408 generates a random number for use as the encryption key. For example, the encryption key module 408 generates the cryptographic key generated using TRNG (true random number generator) hardware within the vehicle-based computer system 400. In other embodiments, an alternative method is possible known as key injection. Key injection is accomplished by having an outside computer system (usually at the manufacturing location) provide a key to the vehicle-based computer system 400. The manufacturing computer generates the key and copies it using a diagnostic test equipment via a CAN bus. Alternative embodiments utilize a password entered by the user into the vehicle-based computer system 400 (via a touch screen, voice command, or the like).

The pairing instruction module 410 is configured to present instructions, to a user, to press a sensor or intermediary device against a part of the vehicle-based computer system 400 prior to transmitting motion data (e.g., mechanical vibrations) to the sensor or intermediary device. In this way, the pairing instruction module 410 operates cooperatively with a display element (not shown) of the vehicle-based computer system 400.

In practice, the encryption key module 408 and/or the pairing instruction module 410 may be implemented with (or cooperate with) the at least one processor 402 to perform at least some of the functions and operations described in more detail herein. In this regard, the encryption key module 408 and/or the pairing instruction module 410 may be realized as suitably written processing logic, application program code, or the like.

The binary motion data output device 412 is configured to transmit motion data, mechanically, to a sensor or intermediary device that is directly physically contacting the vehicle-based computer system 400. The binary motion data output device 412 may be implemented as a haptic touchscreen of the vehicle-based computer system 400, a haptic seat of the vehicle, or an audio speaker system of the vehicle. In this embodiment, the haptic touchscreen, haptic seat, or audio speaker produces a sequence of mechanical vibrations interspersed with periods of stillness, which may represent binary data. Such binary data may be received by a sensor or other vehicle-based device that is in direct physical contact with the vehicle-based computer system 400.

Figure 5:
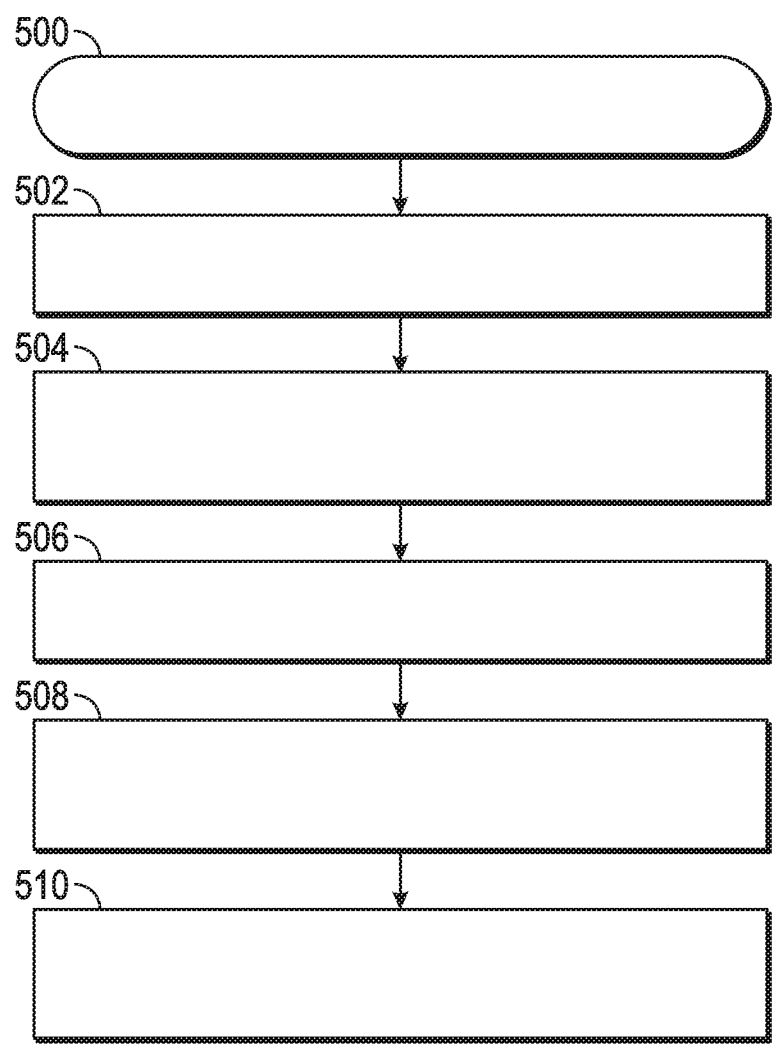
FIG. 5 is a flow chart that illustrates an embodiment of a process for providing encrypted data onboard a vehicle, from the perspective of a sensor, in accordance with the disclosed embodiments.

FIG. 5 is a flow chart that illustrates an embodiment of a process 500 for providing encrypted data onboard a vehicle, from the perspective of a sensor, in accordance with the disclosed embodiments. It should be noted that the sensor can be implemented with the sensor 106 depicted in FIG. 1 and the sensor 300 depicted in FIG. 3. First, the process 500 receives binary motion data, by a motion sensor onboard the vehicle (step 502). In some embodiments, the motion sensor comprises an accelerometer communicatively coupled to the processor. In other embodiments, however, the motion sensor may comprise a gyroscope or other type of motion sensor. In some embodiments, the motion sensor receives the binary motion data via a physical connection between the motion sensor and a vehicle-based computer system. In other embodiments, the motion sensor receives the binary motion data via a physical connection between the motion sensor and an intermediary device communicatively coupled to a vehicle-based computer system.

The binary motion data is an out-of-band communication, which indicates that the binary motion data is transmitted in a secure way that is not associated with wireless data communication channels (e.g., Wi-Fi, Bluetooth, Bluetooth Low Energy, or other wireless data communication protocol). In some embodiments, the binary motion data comprises a series of vibrations and periods of stillness, wherein the series of vibrations and periods of stillness indicate a binary value.

Once received (step 502), the process 500 then interprets the binary motion data to identify an encryption key, by a processor communicatively coupled to the motion sensor (step 504). Here, the binary value indicated by the motion data is used as an encryption key. In other words, the encryption key comprises a binary value indicated by the binary motion data.

In certain embodiments, prior to receiving and interpreting the binary motion data (steps 502-504), the process 500 initiates a data receiving mode of the motion sensor, wherein the data receiving mode comprises a functional state wherein the motion sensor is configured to receive the binary motion data. In this scenario, when the binary motion data is received during the data receiving mode, the process 500 recognizes the binary motion data as the encryption key.

Next, the process 500 stores the encryption key in a memory element communicatively coupled to the processor (step 506). The encryption key is stored for future use, such that any messages transmitted by the processor may be encrypted, using the encryption key. The process 500 then encrypts a message, by the processor, using the encryption key, to generate an encrypted message (step 508). It should be appreciated that any conventional symmetric key cipher algorithm may be used. For example, Advanced Encryption Standard (AES) or any other standard encryption methodology may be used.

The process 500 transmits the encrypted message, via a communication device communicatively coupled to the processor (step 510). As described herein, the process 500 is performed by a vehicle onboard sensor, device, or system that comprises the motion sensor, the processor, the system memory, and the communication device. The vehicle onboard sensor that is configured to communicate with a vehicle-based computer system via a wireless communication network and via a physical, out-of-band, mechanical connection. The process 500 generally transmits encrypted communications via a vehicle onboard wireless network, such as a Bluetooth network or a Bluetooth Low Energy (BLE) network. As described herein, the process 500 first receives an encryption key via an out-of-band communication method, and second, encrypts a message for transmission using the encryption key. Thus, the process 500 receives a securely transmitted encryption key and ensures the secure transmission of the message through use of encryption using the encryption key.

Figure 6:
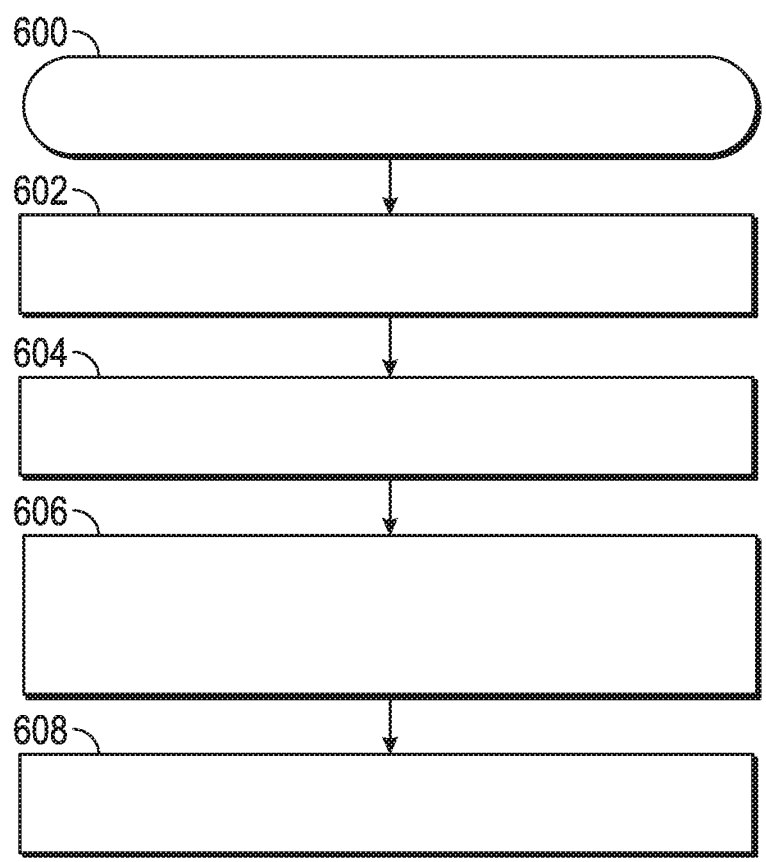
FIG. 6 is a flow chart that illustrates an embodiment of a process for verifying accuracy of received binary motion data onboard a vehicle, from the perspective of a sensor, in accordance with the disclosed embodiments.

FIG. 6 is a flow chart that illustrates an embodiment of a process 600 for verifying accuracy of received binary motion data onboard a vehicle, from the perspective of a sensor, in accordance with the disclosed embodiments. It should be noted that the sensor can be implemented with the sensor 106 depicted in FIG. 1 and the sensor 300 depicted in FIG. 3.

First, the process 600 hashes the encryption key, by the processor, to generate a hash of the encryption key (step 602). Here, the process 600 performs a cryptographic hashing algorithm using techniques that are well-known and commonly used in the art. One example of a such a cryptographic hashing algorithm is SHA256, but it should be noted that any cryptographic hashing algorithm may be used.

Next, the process 600 transmits the hash of the encryption key, via the communication device (step 604). The process 600 transmits the hash of the encryption key from the sensor to the vehicle-based computer system, for confirmation that the encryption key saved in memory of the sensor is accurate and can be used by the sensor to encrypt future communications prior to transmission to the vehicle-based computer system. Here, the process 600 transmits the hash of the encryption key using a standard wireless communication protocol, as described previously with regard to the data communication network 108 of FIG. 1. The process 600 then receives confirmation that the hash of the encryption key matches a master encryption key stored by a vehicle-based computer system (step 606). The confirmation is also a wireless data transmission that is received via the wireless communication device.

After receiving the confirmation, the process 600 stores the encryption key for future use in encrypting data communications for transmission to the vehicle-based computer system (step 608). As described herein, the process 600 hashes the encryption key for security of the wireless data communication of the encryption key from the sensor to the vehicle-based computer system and waits for a confirmation from the vehicle-based computer system that the encryption key is accurate and can be used for future data encryption purposes.

Figure 7:
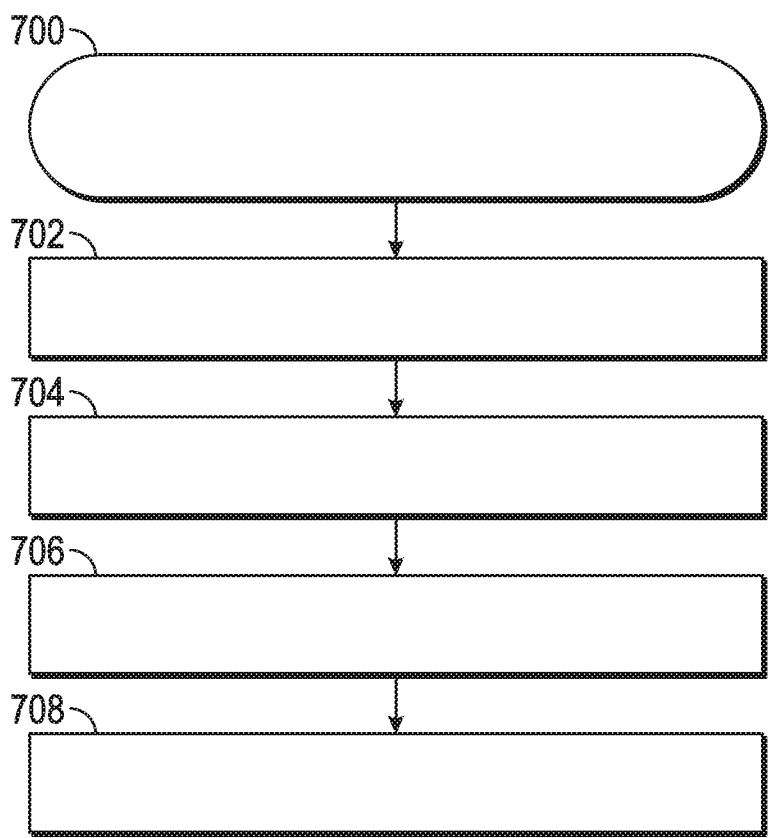
FIG. 7 is a flow chart that illustrates an embodiment of a process for enabling encrypted communications onboard a vehicle, from the perspective of a vehicle-based computer system, in accordance with the disclosed embodiments.

FIG. 7 is a flow chart that illustrates an embodiment of a process 700 for enabling encrypted communications onboard a vehicle, from the perspective of a vehicle-based computer system, in accordance with the disclosed embodiments. It should be noted that the vehicle-based computer system can be implemented with the vehicle-based computer system 104 depicted in FIG. 1 and the vehicle-based computer system 400 depicted in FIG. 4.

The process 700 first receives a user input selection to enter a wireless communication pairing mode (step 702). In exemplary embodiments of the process 700, the wireless communication pairing mode comprises a Bluetooth pairing mode or a Bluetooth Low Energy (BLE) pairing mode. Here, the vehicle-based computer system receives a user input request to enter the wireless communication pairing mode such that the vehicle-based computer system can establish a wireless communication connection with a sensor, device, or system onboard the vehicle.

Next, the process 700 generates an encryption key, in response to the user input selection (step 704). Generally, the process 700 generates a random number for use as an encryption key. For example, the process 700 generates the cryptographic key generated using TRNG (true random number generator) hardware within the vehicle-based computer system. In other embodiments, the process 700 uses an alternative method is possible known as key injection. Key injection is accomplished by having an outside computer system (usually at the manufacturing location) provide a key to the vehicle-based computer system. The manufacturing computer generates the key and copies it using a diagnostic test equipment via a CAN bus. Alternative embodiments of the process 700 utilize a password entered by the user into the vehicle-based computer system (via a touch screen, voice command, or the like).

The process 700 then presents instructions, to a user, to position a motion sensor to receive binary motion data (step 706).

Once the process 700 has generated the encryption key, the user is instructed to move the motion sensor to a place that is in direct physical contact with the vehicle-based computer system. (As described previously, the motion sensor is integrated as part of the sensor that is in communication with the vehicle-based computer system.) In some embodiments, the process 700 provides instructions for the user to position an intermediary device to a place in direct physical contact with the vehicle-based computer system, instead of the motion sensor or the sensor.

After presenting instructions to the user to position the motion sensor appropriately to receive the binary motion data (step 706), the process 700 transmits the binary motion data comprising the encryption key (step 708). Binary motion data is transmitted by the vehicle-based computer system to a sensor (and detected by a motion sensor that is an internal part of the sensor) via an "out-of-band", direct physical connection between the sensor and the vehicle-based computer system or between the intermediary device and the vehicle-based computer system. In certain embodiments, the binary motion data comprises a sequence of vibrations and stillness, wherein the sequence indicates a binary value representative of an encryption key. Here, the process 700 enables encrypted communications by providing the encryption key to the sensor, device, or system onboard the vehicle, such that the sensor, device, or system can use the encryption key to securely encode data communications prior to the wireless transmission of the data communications to the vehicle-based computer system.

Figure 8:
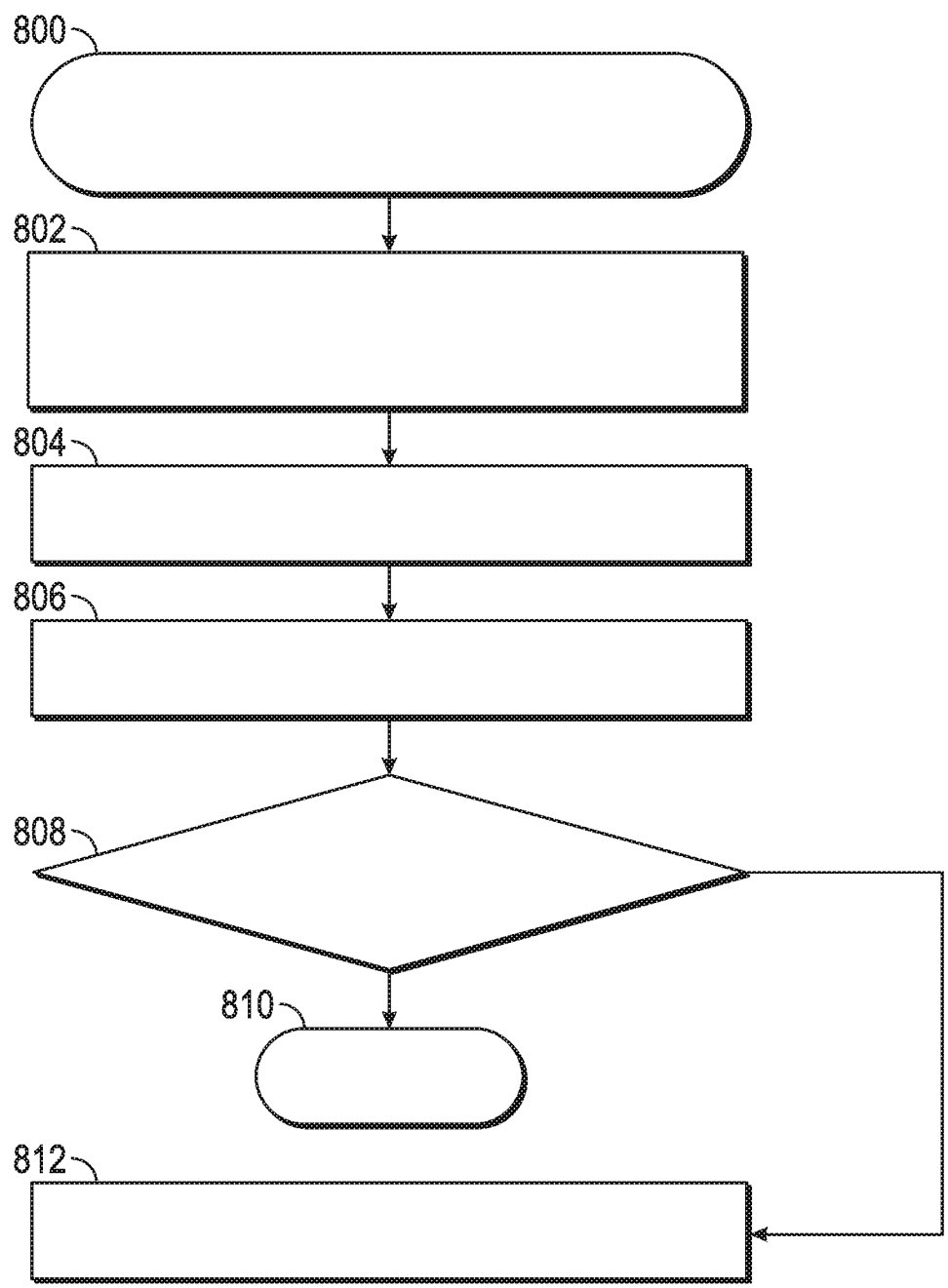
FIG. 8 is a flow chart that illustrates an embodiment of a process for providing confirmation of accuracy of an encryption key, from the perspective of a vehicle-based computer system, in accordance with the disclosed embodiments.

FIG. 8 is a flow chart that illustrates an embodiment of a process 800 for providing confirmation of accuracy of an encryption key, from the perspective of a vehicle-based computer system, in accordance with the disclosed embodiments. It should be noted that the vehicle-based computer system can be implemented with the vehicle-based computer system 104 depicted in FIG. 1 and the vehicle-based computer system 400 depicted in FIG. 4.

First, the process 800 establishes a wireless communication connection to a wireless communication device communicatively coupled to a motion sensor and a processor (step 802). In some embodiments, the process 800 establishes a wireless communication connection from the vehicle-based computer system to a wireless communication device of a vehicle onboard sensor, wherein the sensor further comprises the motion sensor and the processor. Other embodiments include a wireless communication connection to a vehicle onboard system or device. The wireless communication connection may use any wireless communication protocol. Exemplary embodiments of the wireless communication connection include a Bluetooth or Bluetooth Low Energy (BLE) communication protocol, and the process 800 establishes a communication connection via a Bluetooth "pairing" procedure.

Next, the process 800 receives a hash of the encryption key via the wireless communication connection (step 804). Generally, the encryption key has been transmitted by the vehicle-based computer system to the sensor, device, or system onboard the vehicle via an "out-of-band" communication (e.g., a mechanical vibration data transmission via direct physical connection). Here, the process 800 receives a hash of the value that the sensor, device, or system interprets as the encryption key, such that the vehicle-based computer system can confirm or not confirm that the sensor, device, or system has the correct encryption key stored in internal memory.

The process 800 then compares the hash of the encryption key to a hash value of the generated encryption key (step 806). When the hash of the encryption key does not match the hash value of the generated encryption key (the "No" branch of 808), then the process 800 ends. However, when the hash of the encryption key matches the hash value of the generated encryption key (the "Yes" branch of 808), then the process 800 transmits a confirmation, via the wireless communication connection (step 812). The confirmation indicates to the vehicle onboard sensor, device, or system that the encryption key stored in internal memory for use in encrypting data communications for transmission to the vehicle-based computer system, is accurate and ready for use.

The various tasks performed in connection with processes 500-800 may be performed by software, hardware, firmware, or any combination thereof. For illustrative purposes, the preceding descriptions of processes 500-800 may refer to elements mentioned above in connection with FIGS. 1-4. In practice, portions of processes 500-800 may be performed by different elements of the described system. It should be appreciated that processes 500-800 may include any number of additional or alternative tasks, the tasks shown in FIGS. 5-8 need not be performed in the illustrated order, and processes 500-800 may be incorporated into a more comprehensive procedure or process having additional functionality not described in detail herein. Moreover, one or more of the tasks shown in FIGS. 5-8 could be omitted from embodiments of the processes 500-800 as long as the intended overall functionality remains intact.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "computer-readable medium", "processor-readable medium", or "machine-readable medium" may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

The following description refers to elements or nodes or features being "connected" or "coupled" together. As used herein, unless expressly stated otherwise, "coupled" means that one element/node/feature is directly or indirectly joined to (or directly or indirectly communicates with) another element/node/feature, and not necessarily mechanically. Likewise, unless expressly stated otherwise, "connected" means that one element/node/feature is directly joined to (or directly communicates with) another element/node/feature, and not necessarily mechanically. Thus, although the schematic shown in FIGS. 1-3 depict exemplary arrangements of elements, additional intervening elements, devices, features, or components may be present in an embodiment of the depicted subject matter.

For the sake of brevity, conventional techniques related to signal processing, data transmission, signaling, network control, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

Some of the functional units described in this specification have been referred to as "modules" in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. A module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A method for providing out-of-band data onboard a vehicle, the method comprising:
   receiving binary motion data, by a motion sensor onboard the vehicle, via an out of band, direct physical connection between the motion sensor and a vehicle-based computer system, after providing instructions to a user to move the motion sensor to a place that is in direct contact with the vehicle-based computer system;
   interpreting the binary motion data to identify an encryption key, by a processor communicatively coupled to the motion sensor, wherein the encryption key comprises a binary value indicated by the binary motion data;
   storing the encryption key in a memory element communicatively coupled to the processor;
   prior to storing the encryption key:
      hashing the encryption key using a cryptographic hashing algorithm, by the processor, to generate a hash of the encryption key;
      transmitting the hash of the encryption key, via a communication device communicatively coupled to the processor, the communication device comprising a Bluetooth Low Energy (BLE) communication device; and
      receiving confirmation, via the BLE communication device, that the hash of the encryption key matches a master encryption key stored by the vehicle-based computer system, wherein the encryption key is stored after receiving the confirmation;
   after receiving the binary motion data, pairing the BLE communication device to the vehicle-based computer system to create a BLE communication connection;
   encrypting a message using the encryption key, by the processor, to generate an encrypted message; and
   transmitting the encrypted message, via the communication device.

2. The method of claim 1,
   wherein the binary motion data is received via a mechanical vibration data transmission via the direct physical connection between the motion sensor and a vehicle-based computer system.

3. The method of claim 1, further comprising:
   receiving the binary motion data via a physical connection between the motion sensor and an intermediary device communicatively coupled to a vehicle-based computer system.

4. The method of claim 1, wherein the motion sensor comprises an accelerometer communicatively coupled to the processor.

5. The method of claim 1, further comprising:
   initiating a data receiving mode of the motion sensor, wherein the data receiving mode comprises a functional state wherein the motion sensor is configured to receive the binary motion data; and
   recognizing, by the processor, the binary motion data as the encryption key, when the binary motion data is received during the data receiving mode.

6. A system for providing out-of-band data onboard a vehicle, the system comprising:

a memory element;

a motion sensor, configured to receive binary motion data comprising a sequence of vibrations and periods of stillness, wherein the motion sensor is configured to receive the binary motion data via an out of band, direct physical connection between the motion sensor and a vehicle-based computer system, after instructions are provided to a user to move the motion sensor to a place that is in direct contact with the vehicle-based computer system;

a communication device, configured to establish a communication connection to the vehicle-based computer system and to transmit data via the communication connection, the communication device comprising a Bluetooth Low Energy (BLE) communication device; and at least one processor communicatively coupled to the memory element, the motion sensor, and the communication device, the at least one processor configured to:

interpret the binary motion data to identify an encryption key, wherein the encryption key comprises a binary value indicated by the binary motion data;

store the encryption key in the memory element;

prior to storing the encryption key:

hash the encryption key using a cryptographic hashing algorithm, by the processor, to generate a hash of the encryption key;

provide instructions for transmitting the hash of the encryption key, via the communication device; and receive confirmation, via the BLE communication device, that the hash of the encryption key matches a master encryption key stored by the vehicle-based computer system, wherein the encryption key is stored after receiving the confirmation;

after receiving the binary motion data, pair the BLE communication device to the vehicle-based computer system to create a BLE communication connection;

encrypt a message using the encryption key, to generate an encrypted message; and transmit the encrypted message, via the communication device.

7. The system of claim 6, wherein the motion sensor is further configured to receive the binary motion data via a mechanical vibration data transmission via the direct physical connection between the motion sensor and the vehicle-based computer system.

8. The system of claim 6, wherein the motion sensor is further configured to receive the binary motion data via a physical connection between the motion sensor and an intermediary device communicatively coupled to the vehicle-based computer system.

9. The system of claim 6, wherein the motion sensor comprises an accelerometer communicatively coupled to the at least one processor.

10. The system of claim 6, wherein the at least one processor is further configured to:

initiate a data receiving mode of the system, wherein the data receiving mode comprises a functional state wherein the motion sensor is configured to receive the binary motion data; and recognize the binary motion data as the encryption key, when the binary motion data is received during the data receiving mode.

11. A non-transitory, computer-readable medium containing instructions thereon, which, when executed by a processor, perform a method comprising:

receiving binary motion data, via an out band, direct physical connection between a motion sensor and a vehicle-based computer system, after providing instructions to a user to move the motion sensor to a place that is in direct contact with the vehicle-based computer system, wherein the encryption key comprises a binary value indicated by the binary motion data;

identifying an encryption key based on the binary motion data, by the processor, the processor communicatively coupled to the motion sensor;

storing the encryption key in a memory element communicatively coupled to the processor;

prior to storing the encryption key:

hashing the encryption key using a cryptographic hashing algorithm, by the processor, to generate a hash of the encryption key;

transmitting the hash of the encryption key, via a communication device communicatively coupled to the processor, the communication device comprising a Bluetooth Low Energy (BLE) communication device; and receiving confirmation, via the BLE communication device, that the hash of the encryption key matches a master encryption key stored by the vehicle-based computer system, wherein the encryption key is stored after receiving the confirmation;

after receiving the binary motion data, pairing the BLE communication device to the vehicle-based computer system to create a BLE communication connection;

encrypting a message, by the processor, using the encryption key, to generate an encrypted message; and transmitting the encrypted message, via the communication device.

12. The non-transitory, computer-readable medium of claim 11, wherein the method further comprises:

initiating a data receiving mode of the motion sensor, wherein the data receiving mode comprises a functional state wherein the motion sensor is configured to receive the binary motion data; and recognizing, by the processor, the binary motion data as the encryption key, when the binary motion data is received during the data receiving mode.

13. The non-transitory, computer-readable medium of claim 11, wherein the binary motion data is received via a mechanical vibration data transmission via the direct physical connection between the motion sensor and a vehicle-based computer system.

* * * * *